3,677,963
DEFOAMER COMPOSITION AND METHOD OF PREPARATION

Irwin A. Lichtman, Oradell, and Abraham M. Rosengart, Newark, N.J., assignors to Diamond Shamrock Corporation, Cleveland, Ohio
No Drawing. Filed Sept. 30, 1970, Ser. No. 77,009
Int. Cl. B01d *17/00, 19/04;* C09k *3/00*
U.S. Cl. 252—358                                    10 Claims

ABSTRACT OF THE DISCLOSURE

Defoamer compositions are prepared using substituted amides, oil soluble organic polymers, and hydrocarbon oil, by means of a novel quick-chilling process. Optionally, fats and silicone oil may be present. The compositions may be used for defoaming and/or preventing foam build-up.

BACKGROUND OF THE INVENTION

(1) Field of the invention

This invention relates to a process for manufacturing a defoamer composition and the product thereof. As used herein, the term "defoam" is considered to include "knock-down" of existing foam and/or "hold-down" of future foam.

(2) Description of prior art

The foaming of liquids is a frequent cause of trouble in industrial processes. Chemical methods for preventing or reducing the amount of foam include the addition of various organic compounds including amides, alcohols, oils, and the like, various inorganic materials such as hydrophobic minerals, silicone oils and the like, and compositions of these materials and the like.

There are many industrial processes in which solutions or suspensions in various base systems are handled and in which foaming in the system must be diminished or prevented to avoid interference by the foam with the efficient conduct of the process. Examples of such interferences are the foaming of boiler water, foaming in textile processing, the foaming of boiling sugar-beet runoffs, and the foaming of paper pulp suspensions. In addition, it is extremely desirable for paints, coatings, and the like not to foam so as to avoid entrained air bubbles from disfiguring the coated surface. Many more instances in which the diminishing or prevention of foam is desirable will come to mind.

In the paper industry, foaming problems are encountered in the handling of processing liquors. Black liquor results from cooking pulpwood in an alkaline solution in the soda or sulfate papermaking process. It contains nearly all of the chemicals employed during the process together with organic matter extracted from the wood. Foaming is increased by the processing of highly resinous woods. The sulfate process uses more resinous woods than the soda process, and for that reason foaming is more severe. The foaming primarily occurs when the wood pulp is washed, and when it is agitated during the screening process.

SUMMARY OF THE INVENTION

This invention relates to a novel process for manufacturing a defoamer composition and the product thereof. The said defoamer composition comprises a uniquely quick-chilled mixture of substituted amides, organic polymers, and hydrocarbon oil, to which also may be added fats and silicone oil. The said process comprises in part heating certain ingredients to a melt and quick-chilling the melt by dropping the same into an inert cooling liquid, thereby creating a novel suspension of defoamer agglomerates which is then homogenized to break down the agglomerates into smaller particles which remain in suspension. Alternatively, the said melt may be quick-chilled by spraying it upon a cool surface, removing the condensate that is formed, suspending it in an inert liquid, and homogenizing to obtain smaller particles.

DESCRIPTION OF THE PREFERRED EMBODIMENTS

Useful amides include those obtained by reaction of a polyamine containing at least one alkylene group having from two to six carbon atoms and a fatty acid having from six to eighteen carbon atoms. One example is the amide obtained by reaction of a polyamine and a fatty acid or mixture of fatty acids such as hexanoic, decanoic, lauric, palmitic, oleic, and stearic acids, hydroxy acids such as ricinoleic acid, or naphthenic acids such as are obtained as byproducts from the refining of petroleum. Natural mixtures of fatty acids such as, tall oil acids, tallow fatty acids and the like also can be used. Suitable amines include ethylene diamine, butylene diamine, diethylene triamine, triethylene tetramine, hexamethylene diamine, decamethylene diamine, hydroxyethyl ethylene diamine, 1:3-diamino-2-propanol or the like.

One of the amides useful herein is prepared in the following manner. 95.7 parts by weight of bleached-hydrogenated tallow fatty acids is charged into a stainless steel reactor with a condenser, water trap and agitator. The entire process including charging of reactants and cooling of the reaction product is carried out under a nitrogen atmosphere. The acids charge is heated to about 165–175° C. and 10.1 parts by weight of ethylene diamine is added with agitation. After the diamine is added, the reaction mixture is heated to about 180–185° C. The mixture is reacted at about 180–185° C. until the acid value is less than 5 and the alkalinity less than 0.6% by weight. The resulting reaction product of ethylene diamine and tallow fatty acid is then cooled to room temperature. If desired, the cooled mass can be ground to obtain the product in the form of a very fine powder.

Almost any oil soluble polymers are useful to some degree in this formulation and include vinyl acetate copolymerized with ethylenically unsaturated comonomers which are copolymerizable therewith such as maleic acid esters, ethylene, propylene and butylene; polyalkylene oxide adducts such as methyl glucoside propoxylated with four moles of propylene oxide; glycerine propoxylated with fifteen moles of ethylene oxide and forty-five moles of propylene oxide; the copolymer of lauryl methacrylate and vinyl pyrrolidone; methacrylate copolymers dissolved in solvent—refined (100 SUS at 100° F.) neutral oil; and phenol modified coumaroneindene resins. These materials can be used alone or in admixture with each other.

The oil soluble polymer which is preferred is a copolymer of vinyl acetate and fumaric acid esterified with a tallow alcohol. Such an oil soluble polymer is available from Enjay Chemical Co. in the form of a mineral oil solution thereof under the trademark "Paratone 440" which consists of about 25 parts of weight of said copolymer in 75 parts by weight of a liquid hydrocarbon. This product has the following properties:

Viscosity at 210° F., cs. _____ 1300
Flash Point, COC, ° F. _____ 360
Color, ASTM _____ 40
Specific Gravity 60/60° F. _____ 0.92

The hydrocarbon oil can be any liquid aliphatic, alicyclic, aromatic hydrocarbon or mixture thereof. The hydrocarbon should be liquid at room temperature and atmospheric pressure, have a viscosity of from about 30 to about 400 SUS (Saybolt Universal Seconds at 100° F.), a minimum boiling point equal to the melting point of the amide and an average of from about 6 to about 25 carbon atoms. Suitable hydrocarbon oils include dodecane, mineral seal oil, stoddard solvent, petroleum naphtha, toluene, xylene, paraffinic mineral oil, naphthenic mineral oil or the like. If desired, mixtures of two or more hydrocarbon oils can be used. The preferred hydrocarbon oil is paraffinic mineral oil.

The fat must be oil-soluble and surface active, and acts to provide a more amorphous defoamer particle. Suitable fats include but are not limited to triglycerides generally, and more specifically, castor oil, alkoxylated castor oil, blown soya oil, hydrogenated castor oil, tall oil, fish oil, mineral oil, and the like.

The castor oil can be any refined castor oil varying in quality from technical grade (meeting Federal Specification JJJ–C–86, Grade 3) to very high quality (meeting Federal Specification JJJ–C–86, Grade 1). The oils may have the following properties:

|  | Color (Gardner) | Acid value | Viscosity stokes at 25° C. | Specific gravity, 25° C./ 25° C. | Iodine value (Wijs) | Hydroxyl value | Saponification value | Pour point, ° C. |
| --- | --- | --- | --- | --- | --- | --- | --- | --- |
| Grade 1 | 1+ | 2 | 7.5 | 0.959 | 86 | 164 | 180 | −23.3 |
| Grade 3 | 5 | 5 | 7.5 | 0.959 | 86 | 158 | 180 | −23.3 |

The alkoxylated castor oil can be the reaction product of castor oil and an alkylene oxide having from two to six carbon atoms, for example, ethoxylated castor oil in which from 2 to about 30 parts by weight of ethylene oxide are reacted with about 1 part by weight of castor oil. Another example would be propoxylated castor oil in which from 2 to about 30 parts by weight of propylene oxide is reacted with about 1 part by weight of castor oil.

The silicone oil can be a polysiloxane oil such as an alkyl, aryl, alicyclic or aralkyl siloxane or polysiloxane having a viscosity of from about 10 to about 3000 centistokes at 25° C. Preferred silicone oils include alkyl polysiloxanes having viscosities of from about 40 to about 100 centistokes at 25° C. These alkyl polysiloxanes include dimethyl polysiloxane, diethyl polysiloxane, dipropyl polysiloxane, methyl ethyl polysiloxane, dioctyl polysiloxane, dihexyl polysiloxane, methyl propyl polysiloxane, dibutyl polysiloxane, didodecyl polysiloxane or the like.

The inert cooling liquid serves the dual function of being the means by which the melt is quick-chilled and of being the liquid vehicle in which the agglomerate which forms upon quick-chilling is suspended. It is also possible that to a small degree this inert cooling liquid may constitute a portion of the defoamer particle structure. Further dilution of the suspension can be achieved by adding an additional amount of the inert liquid in which the melt was quick-chilled, or any other inert liquid miscible therewith. The inert cooling liquid can be any carrier or mixture of carriers which will suspend but not react with the other ingredients of the composition. The inert cooling liquid can be an alcohol such as ethanol, dodecanol, cyclohexanol, benzyl alcohol, hexamethylene glycol, and the like; an aliphatic, alicyclic or aromatic hydrocarbon solvent, or a mixture thereof; an animal, vegetable or mineral oil, or a mixture thereof; and water or aqueous solutions of inorganic salts such as sodium chloride, potassium carbonate, cadmium nitrate, aluminum sulfate, zinc permanganate, and the like. The preferred inert cooling liquid is paraffin oil.

The parameters of the ingredients of the defoamer composition are as follows:

The amide may be present in from about 1 to about 20 parts by weight.

The oil soluble organic polymer may be present in from about 1 to about 15 parts by weight.

The hydrocarbon oil may be present in from about 1 to about 50 parts by weight.

The fat may be present in amounts up to about 5 parts by weight.

The silicone oil may be present in amounts up to about 3 parts by weight.

The inert cooling liquid may be present in an amount whose minimum is the volume required to quick-chill the melt to the desired temperature at a given starting temperature of the inert cooling liquid, given a specific melt temperature, and whose maximum is a volume which will dilute the defoamer particles formed therein by the quick-chilling process to a suspension of minimal utility. The preferred amount during the quick-chilling step is that volume at a given temperature which is sufficient to hold the inert cooling liquids temperature below the softening point of the amide after the melt is added.

The unique defoamer compositions which are the subject of this invention are prepared by a novel process. Broadly, the process consists of charging a receptacle with the ingredients and proportions desired, heating the ingredients to obtain a melt and quick-chilling the melt so as to obtain an agglomerate, which is then homogenized while suspended in an inert carrier to obtain suspended defoamer particles. The quick-chilling step yields unexpected results in that the defoamer composition is more effective when this step is employed than when the melt is allowed to cool.

More particularly, the process consists of charging a premix tank with an amide which is the reaction product of a polyamine containing at least one alkylene group having from 2 to 6 carbon atoms and a fatty acid having from 6 to 18 carbon atoms, an oil soluble organic polymer, hydrocarbon oil, and optionally, a fat. These ingredients are then heated. The minimum temperature to which these ingredients must be heated is the melting point of the highest melting ingredient since they must be heated until a uniform melt is obtained. The maximum temperature to which these ingredients may be heated is the flash point or point of decomposition of the least stable ingredient, whichever is lower. The optimum temperature is just below the maximum.

The higher temperature guarantees that no amide crystalline nuclei remain within the melt and also keeps the polymer chains in a more open (distended) position. The presence of amide crystalline nuclei in the melt would produce less effective defoamer particles, since such nuclei would act as seed crystal for the formation of identical larger crystals upon quick-chilling. It has been discovered that quick-chilling a uniform melt in which all amide crystalline nuclei previously existing are destroyed, will result in the formation of rheologically differentiated particles upon quick-chilling of the uniform melt, and that these particles act as a superior defoamer.

The melt should be maintained at the temperature to which it has been heated after it attains a uniform, clear, appearance to ensure that any sub-visual amide crystalline nuclei remaining in the melt are destroyed.

The quick-chilling step is then employed. The melt is dropped as rapidly as possible into the inert cooling liquid which is being continually agitated. It is critical that no part of the melt be allowed to cool sufficiently to form particles by slow cooling and that all of the particles are formed by the dropping of the melt into the inert cooling liquid. The quick-chilling of the melt results in the formation of an agglomerate which remains suspended in the inert cooling liquid upon formation.

After the agglomerate has been formed, the inert cooling liquid, whose temperature has been raised by addition of the melt, is cooled to about room temperature.

The inert cooling liquid with the agglomerate suspended therein is then homogenized at from 300 to 4,000 p.s.i., and preferably at about 300 to 2,000 p.s.i., in a standard homogenizer such as the Manton-Gaulin or the Case-Logeman. This homogenization should be sufficient to break down the agglomerate into defoamer particles but should not be continued to the point where the particles are destroyed.

If desired, silicone oil may then be added and blended uniformly with the suspension.

The following apparatus and test method was used in determining the effectiveness of various compositions in knocking down and holding down foam in black liquor. The apparatus and method could, however, be used for testing any liquid which forms a foam upon agitation and/or heating.

A 1000 cc. tall form beaker is used as the primary container for the liquid to be tested. A curved glass outlet fused onto the base of the beaker is connected with a rubber hose to a centrifugal pump. The pump is used to circulate continuously the test liquid from the beaker into the pump and back into the beaker. Pumping is carried out at a rate so that the test liquid in the beaker is agitated by the re-entering test liquid to such an extent that foam forms. The pumping rate is about two gallons per minute. Test liquid enters the beaker at a point about 6 centimeters above the surface of the liquid in the beaker and strikes the surface of the liquid in the beaker at an angle of 90°.

In carrying out the testing of the defoamer compositions, 50 cc. of freshly obtained concentrated black liquor is charged at about 75° C. into the beaker. This liquid, when quiescent, fills the beaker to a level of about 8.3 centimeters from the bottom. This level is marked and labeled the 0 line. In the test for hold down, 0.1 cc. of defoamer composition is added to the 500 cc. of test liquid in the beaker. The pump and stop watch are started simultaneously. Height of the foam above the 0 line is measured at 15 second intervals for the first minute, then at 30 second intervals, and recorded. In the test for knock-down, the liquor is agitated and heated prior to the addition of any defoamer composition. After a foam has built up to 8 centimeters, 0.1 cc. of the defoamer composition to be tested is added and the data is recorded as above.

A test for holddown of foam in a latex paint formulation was conducted by adding the composition to be tested to a latex paint containing no defoamer and shaking on a Red Devil Mixer for ten minutes. The shaken sample was then weighed and this weight was used to calculate the density of the paint (pounds/gallon) and the volume percentage of entrapped air. These figures were then compared with those for unshaken paint, and paint shaken without any defoamer.

EXAMPLE I

A defoamer composition was prepared using the following ingredients:

| Parts by weight | Ingredient | Part |
|---|---|---|
| 6.0 | Paraffin oil (Gulf 2201 oil) | A-1 |
| 1.0 | Castor oil, Brazilian #3 | A-2 |
| 4.0 | Stearic diamide of ethylene diamine | A-3 |
| 3.5 | Vinyl acetate fumaric acid copolymer (Paratone 440, Enjay). | A-4 |
| 85.3 | Paraffin oil (Gulf 2201 oil) | B |
| 0.2 | Silicone oil (Silicone fluid 200-50 c.s., Dow) | C |

The process for preparing this composition was as follows: Ingredients A-1, A-2 and A-3 were charged into a mixing tank and heated to 140° C. Ingredient A-4 was then added and the temperature brought back up to 140° C. This temperature was maintained for 15 minutes after a clear melt was obtained. Part B was charged into a second mixing tank, which was fitted for cooling and rapid turbulent agitation. Part B was then cooled to 15° C. The melt (Part A) was then dropped as rapidly as possible into the second mixing tank containing Part B, under vigorous agitation. An agglomerate suspension was formed by this quick-chilling process. The temperature of this agglomerate suspension was lowered to 25° C. The agglomerate suspension was then homogenized at 1500 p.s.i. and charged to a receiving tank. The defoamer particle suspension formed after homogenization was stirred for 10-15 minutes and then raised in temperature to 50° C. The stirring was then discontinued and the defoamer particle suspension was maintained at 50° C. for 4 to 12 hours, and then cooled, with agitation, to 25° C. The silicone oil was then added and blended in for ½ hour. The composition prepared by this process and with these ingredients was a superior defoamer within the scope of this invention.

EXAMPLE II

A defoamer composition was prepared using the same ingredients and proportions thereof as in Example I, but prepared by the following quick-chill process. The ingredients of Part A were charged to a mixing tank and melted in the same manner as in Example I, but were quick-chilled by dropping the melt at 140° C. as rapidly as possible onto a cold metallic surface. The metallic surface used in this instance was a rectangular steel baking pan, although any clean surface that is a good heat conductor would sufficient. The dropping of the melt was accompanied by vigorous manual stirring so as to spread the melt over the surface and thereby chill it as rapidly as possible. The agglomerate that formed was then scraped off and added to Part B, which was at room temperature and homogenized in the same maner as Example I. The silicone oil was then added in the same manner as Example I. The composition prepared by this process and with these ingredients was a superior defoamer within the scope of this invention.

EXAMPLE III

A defoamer composition was prepared using the process of Example II and the ingredients of Example I, only in the following proportions:

| Parts by weight: | Part |
|---|---|
| 12.0 | A-1 |
| 2.0 | A-2 |
| 8.0 | A-3 |
| 7.0 | A-4 |
| 70.8 | B |
| 0.2 | C |

The composition prepared by this process and with these ingredients was a superior defoamer within the scope of this invention.

EXAMPLE IV

A defoamer composition was prepared using the same ingredients and proportions thereof as in Example I, but prepared by the following slow cooling process. The ingredients of Part A were charged to a mixing tank and melted in the same manner as in Example I, but were then cooled slowly to room temperature by allowing the melt to stand for about 20 minutes. The solid that formed was then added to Part B, which was a troom temperature, and homogenized in the same manner as Example I. The silicone oil was then added in the same manner as Example I. The composition prepared by this process was an inferior defoamer and was not within the scope of this invention.

EXAMPLE V

A defoamer composition was prepared using the same ingredients and proportions thereof as in Example IV. The process of preparation was also the same as in Example IV, except that Parts A and B were combined before melting. The composition prepared by this process was an inferior defoamer and was not within the scope of this invention.

EXAMPLE VI

The compositions of Examples I through V were tested in the manner set forth in the specification on a black liquor containing 16% solids, with the following results:

| Example | Time (in seconds) | | | | | | | |
|---|---|---|---|---|---|---|---|---|
| | 15 | 30 | 45 | 60 | 90 | 120 | 150 | 180 |
| I | 2/24 | 10/29 | 19/35 | 29/46 | 53/82 | 80/95 | 95/* | */* |
| II | 3/30 | 16/38 | 29/48 | 41/67 | 66/95 | 95/* | */* | |
| III | 1/21 | 16/28 | 25/39 | 38/53 | 63/90 | 92/* | */* | |
| IV | 8/50 | 25/68 | 52/88 | 66/* | */* | | | |
| V | 16/65 | 41/85 | 61/* | 75/* | */* | | | |

NOTE.—An asterisk denotes that the foam was over the top of the measuring scale at that point. The numbers above the slash represent the height of foam in millimeters for hold-down tests. The numbers below the slash represent the height of foam in millimeters for knock-down tests. In the hold-down test, the defoamer is added before any foam is generated. In the knock-down test, the defoamer is added after 85 millimeters of foam is generated.

The above test results clearly indicate that the quick-chilled defoamers of Examples I, II and III were superior defoamers to the slow-cooled defoamers of Examples IV and V.

What we claim is:

1. A process for preparing a defoamer composition comprising:
    (A) charging a receptacle with
        (a) from about 1 to about 20 parts by weight of an amide which is the reaction product of a polyamine containing at least one alkylene group having from two to six carbon atoms and a fatty acid having from six to eighteen carbon atoms,
        (b) from about 1 to about 15 parts by weight of an oil soluble organic polymer,
        (c) from about 1 to about 50 parts by weight of a hydrocarbon oil, and
        (d) from 0 to about 5 parts by weight of a fat;
    (B) melting the mixture by heating it to a temperature not lower than the melting point of the highest melting ingredient and not higher than the flash point or point of decomposition of the least stable ingredient, whichever is lower;
    (C) maintaining the melt at the temperature of step B after a clear, uniform melt has been obtained for a sufficient period to destroy any sub-visual crystalline nuclei of the said amide remaining therein;
    (D) quick-chilling the melt by
        (a) rapidly charging the same into an inert cooling liquid present in an amount and at a temperature sufficient to hold the temperature of the inert cooling liquid below the softening point of the amide after the melt is added thereto, and which is being continually agitated, thus forming an agglomerate which remains suspended therein, and cooling the agglomerate suspension to room temperature, or
        (b) rapidly charging the same onto a cold, heat conductive surface accompanied by vigorous stirring and spreading of the melt over the surface thus forming an agglomerate, scraping the agglomerate off the surface and charging it into a tank containing an inert cooling liquid at room temperature, thus forming an agglomerate suspension;
    (E) homogenizing the agglomerate suspension at from about 300 p.s.i. to about 2,000 p.s.i., thus forming defoamer particles which remain in suspension; and
    (F) adding from 0 to about 3 parts by weight of silicone oil and blending uniformly with the emulsion.

2. A process according to claim 1 in which the amide is the stearic diamide of ethylene diamine, the oil soluble organic polymer is a vinyl acetate fumaric acid copolymer, the hydrocarbon oil is paraffin oil, the inert cooling liquid is one of a group consisting of paraffin oil, mineral oil, water, or an aqueous inorganic salt solution, and the fat is one of a group consisting of castor oil, and the reaction product of castor oil and an alkylene oxide having from two to six carbon atoms.

3. A process according to claim 1 in which: the amide is present in from about 2 to about 6 parts by weight; the oil soluble organic polymer is present in from about 2.5 to about 3.5 parts by weight; the hydrocarbon oil is present in from about 4 to about 8 parts by weight; the fat is present in from about 0.5 to about 1.5 parts by weight; and the silicone oil is present in from about 0.1 to about 0.3 parts by weight.

4. A process according to claim 1 in which the melting step B is conducted at from about 130° C. to about 150° C.; the maintaining step C is conducted for a period of from about 10 to about 20 minutes; the inert cooling liquid of step D (a) is at from about 10° C. to about 25° C. prior to charging of the melt thereinto and the cooling of the agglomerate suspension is from about 20° C. to about 30° C.; and the homogenizing step E is conducted at from about 1,250 p.s.i. to about 1,750 p.s.i.

5. A process according to claim 1 in which after step E, the defoamer particle suspension is heated with stirring, to a temperature of from about 40° C. to about 60° C., maintained at that temperature for from about 4½ to about 12 hours, and then cooled to from about 20° C. to about 30° C. with agitation.

6. The product of the process of claim 1.
7. The product of the process of claim 2.
8. The product of the process of claim 3.
9. The product of the process of claim 4.
10. The product of the process of claim 5.

References Cited

UNITED STATES PATENTS 3,180,786  4/1965  Domba et al. _____ 252—321 X

JOHN D. WELSH, Primary Examiner

U.S. Cl. X.R.

252—321

PO-1050
(5/69)

UNITED STATES PATENT OFFICE
CERTIFICATE OF CORRECTION

Patent No. 3,677,963          Dated July 18, 1972

Inventor(s) Irwin A. Lichtman and Abraham M. Rosengart

It is certified that error appears in the above-identified patent and that said Letters Patent are hereby corrected as shown below:

Column 3, line 8, "carban" should be --carbon--. Column 4, line 34, after "cool" insert --slowly--; column 4, line 54, "crystal" should be --crystals--. Column 5, line 34, "50 cc." should be --500 cc.--. Column 6, line 28, "sufficient" should be --suffice--; column 6, line 33, "maner" should be --manner--; column 6, line 62, "troom" should be --room--.

Signed and sealed this 25th day of December 1973.

(SEAL)
Attest:

EDWARD M. FLETCHER, JR.          RENE D. TEGTMEYER
Attesting Officer          Acting Commissioner of Patents